(12) United States Patent
Hirsch et al.

(10) Patent No.: US 8,788,935 B1
(45) Date of Patent: Jul. 22, 2014

(54) SYSTEMS AND METHODS FOR CREATING OR UPDATING AN APPLICATION USING WEBSITE CONTENT

(71) Applicant: Media Direct, Inc., Deerfield Beach, FL (US)

(72) Inventors: Scott Hirsch, Boca Raton, FL (US); Sunny Rajpal, Sunrise, FL (US)

(73) Assignee: Media Direct, Inc., Deerfield Beach, FL (US)

( * ) Notice: Subject to any disclaimer, the term of this patent is extended or adjusted under 35 U.S.C. 154(b) by 0 days.

(21) Appl. No.: 13/922,944

(22) Filed: Jun. 20, 2013

Related U.S. Application Data

(63) Continuation of application No. 13/831,111, filed on Mar. 14, 2013.

(51) Int. Cl.
*G06F 17/00* (2006.01)
*G06F 9/44* (2006.01)

(52) U.S. Cl.
CPC ... *G06F 8/38* (2013.01); *G06F 8/20* (2013.01)
USPC .............................. 715/234; 717/106; 717/120

(58) Field of Classification Search
CPC .............. G06F 8/30; G06F 8/38; G06F 8/71; G06F 17/30256; G06F 8/20; G06F 8/36; G06F 17/30905; G06F 8/34; G06F 17/30864; G06F 17/2745; G06F 9/44; G06F 17/218; G06F 17/243; G06F 17/30011; G06F 17/30
USPC ........................... 715/234, 239; 717/106, 120
See application file for complete search history.

(56) References Cited

U.S. PATENT DOCUMENTS

| | | | |
|---|---|---|---|
| 4,340,973 A | 7/1982 | Umetsu | |
| 5,950,167 A | 9/1999 | Yaker | |
| 6,023,275 A | 2/2000 | Horvitz et al. | |
| 6,311,194 B1 * | 10/2001 | Sheth et al. | 715/236 |
| 6,332,163 B1 | 12/2001 | Bowman-Amuah | |

(Continued)

FOREIGN PATENT DOCUMENTS

| | | |
|---|---|---|
| CN | 101276276 | 10/2008 |
| CN | 101686427 | 3/2010 |

(Continued)

OTHER PUBLICATIONS

UppSite; web.archive.org/web/20111026105033/http://www.uppsite.com/; Oct. 25, 2011-Nov. 1, 2011, pp. 1-24.*

(Continued)

*Primary Examiner* — Laurie Ries
*Assistant Examiner* — Benjamin Smith
(74) *Attorney, Agent, or Firm* — Bryan Cave LLP

(57) ABSTRACT

The disclosure herein relates to systems and methods for creating or updating applications using website content. An input may be received that identifies website content to be utilized in creating or updating an application. One or more application modules may to be derived from the website content. The website content may be analyzed in accordance with a rule set to detect website features associated with the website. The website features may be incorporated into the one or more application modules. The application modules may then be compiled into an application such as a mobile application or HTML 5 application.

19 Claims, 7 Drawing Sheets

(56) References Cited

U.S. PATENT DOCUMENTS

| | | | |
|---|---|---|---|
| 6,470,447 B1 | 10/2002 | Lambert et al. | |
| D495,339 S | 8/2004 | Gildred | |
| D496,370 S | 9/2004 | Gildred | |
| D548,743 S | 8/2007 | Takahashi et al. | |
| D555,660 S | 11/2007 | Noviello et al. | |
| 7,331,035 B2 | 2/2008 | Loos et al. | |
| 7,421,577 B2 | 9/2008 | Ichikawa et al. | |
| D587,720 S | 3/2009 | Noviello et al. | |
| D590,407 S | 4/2009 | Watanabe et al. | |
| D604,740 S | 11/2009 | Matheny et al. | |
| 7,716,634 B2 | 5/2010 | Ross et al. | |
| D627,790 S | 11/2010 | Chaudhri | |
| D631,887 S | 2/2011 | Vance et al. | |
| 7,890,926 B2 | 2/2011 | Balathandapani et al. | |
| 7,899,847 B2* | 3/2011 | Lau et al. | 707/803 |
| 7,913,234 B2 | 3/2011 | Neil et al. | |
| 7,920,852 B2 | 4/2011 | Neil et al. | |
| 7,933,965 B2 | 4/2011 | Bonar et al. | |
| 7,934,019 B2 | 4/2011 | Bonar et al. | |
| D638,853 S | 5/2011 | Bringa | |
| 7,962,762 B2 | 6/2011 | Kirsch et al. | |
| D654,085 S | 2/2012 | Jones et al. | |
| 8,122,107 B2 | 2/2012 | Bonar et al. | |
| D656,157 S | 3/2012 | Khan et al. | |
| 8,146,156 B2 | 3/2012 | King et al. | |
| 2003/0002631 A1 | 1/2003 | Gaddipati | |
| 2003/0084449 A1 | 5/2003 | Chane et al. | |
| 2004/0100479 A1 | 5/2004 | Nakano et al. | |
| 2004/0250238 A1 | 12/2004 | Singh et al. | |
| 2004/0260939 A1 | 12/2004 | Ichikawa et al. | |
| 2006/0044307 A1 | 3/2006 | Song | |
| 2006/0129972 A1 | 6/2006 | Tyburski et al. | |
| 2006/0167860 A1* | 7/2006 | Eliashberg et al. | 707/3 |
| 2006/0193264 A1 | 8/2006 | Bonar et al. | |
| 2007/0016925 A1 | 1/2007 | Vaysman et al. | |
| 2007/0061724 A1 | 3/2007 | Slothouber et al. | |
| 2007/0099658 A1 | 5/2007 | Borquez et al. | |
| 2007/0100648 A1 | 5/2007 | Borquez et al. | |
| 2007/0106764 A1 | 5/2007 | Mansfield | |
| 2007/0168947 A1 | 7/2007 | Halbedel et al. | |
| 2007/0174818 A1 | 7/2007 | Pasula | |
| 2007/0186241 A1 | 8/2007 | Sugimoto et al. | |
| 2007/0220494 A1 | 9/2007 | Spooner | |
| 2007/0240133 A1 | 10/2007 | Neil et al. | |
| 2007/0261090 A1 | 11/2007 | Miller et al. | |
| 2008/0015955 A1 | 1/2008 | Ehrman et al. | |
| 2008/0016176 A1 | 1/2008 | Leitner | |
| 2008/0046238 A1 | 2/2008 | Orcutt | |
| 2008/0059893 A1 | 3/2008 | Byrne et al. | |
| 2008/0222621 A1 | 9/2008 | Knight et al. | |
| 2008/0228906 A1* | 9/2008 | Yerubandi et al. | 709/223 |
| 2009/0119268 A1* | 5/2009 | Bandaru et al. | 707/3 |
| 2009/0125376 A1 | 5/2009 | Sundaresan et al. | |
| 2009/0131035 A1 | 5/2009 | Aiglstorfer | |
| 2009/0183138 A1 | 7/2009 | Loos et al. | |
| 2009/0216800 A1 | 8/2009 | Neil et al. | |
| 2009/0228862 A1 | 9/2009 | Bertelrud et al. | |
| 2009/0259940 A1 | 10/2009 | Moraes | |
| 2009/0300578 A1 | 12/2009 | Neil | |
| 2009/0300656 A1 | 12/2009 | Bosworth et al. | |
| 2009/0307679 A1 | 12/2009 | Lee et al. | |
| 2010/0017812 A1 | 1/2010 | Nigam | |
| 2010/0068680 A1 | 3/2010 | Quintilio | |
| 2010/0138784 A1 | 6/2010 | Colley | |
| 2010/0146442 A1 | 6/2010 | Nagasaka et al. | |
| 2010/0174974 A1 | 7/2010 | Brisebois | |
| 2010/0180213 A1* | 7/2010 | Karageorgos et al. | 715/753 |
| 2010/0223393 A1 | 9/2010 | Silverbrook et al. | |
| 2010/0251230 A1 | 9/2010 | O'Farrell et al. | |
| 2010/0251292 A1 | 9/2010 | Srinivasan et al. | |
| 2010/0281475 A1 | 11/2010 | Jain et al. | |
| 2010/0319040 A1 | 12/2010 | Diaz Perez | |
| 2010/0333137 A1 | 12/2010 | Hamano et al. | |
| 2011/0023016 A1 | 1/2011 | Khader et al. | |
| 2011/0078715 A1 | 3/2011 | Chung et al. | |
| 2011/0154305 A1 | 6/2011 | Leroux et al. | |
| 2011/0161394 A1 | 6/2011 | Chidel et al. | |
| 2011/0161912 A1 | 6/2011 | Eteminan et al. | |
| 2011/0167336 A1 | 7/2011 | Aitken et al. | |
| 2011/0185392 A1 | 7/2011 | Walker | |
| 2011/0214056 A1 | 9/2011 | Fleizach et al. | |
| 2011/0231872 A1 | 9/2011 | Gharachorloo et al. | |
| 2011/0289524 A1 | 11/2011 | Toner et al. | |
| 2012/0005702 A1 | 1/2012 | Tindell | |
| 2012/0008786 A1 | 1/2012 | Cronk et al. | |
| 2012/0023131 A1 | 1/2012 | Downey et al. | |
| 2012/0036494 A1 | 2/2012 | Gurumohan et al. | |
| 2012/0036498 A1 | 2/2012 | Akirekadu et al. | |
| 2012/0042036 A1 | 2/2012 | Lao et al. | |
| 2012/0066601 A1 | 3/2012 | Zazula et al. | |
| 2012/0083911 A1 | 4/2012 | Louboutin et al. | |
| 2012/0089933 A1 | 4/2012 | Gerand et al. | |
| 2012/0159310 A1* | 6/2012 | Chang et al. | 715/239 |
| 2012/0167047 A1 | 6/2012 | Wyler et al. | |
| 2012/0284252 A1* | 11/2012 | Drai et al. | 707/709 |
| 2013/0174012 A1* | 7/2013 | Kwan et al. | 715/234 |

FOREIGN PATENT DOCUMENTS

| | | |
|---|---|---|
| JP | 2009/104568 | 3/2011 |
| WO | WO 96/19779 | 6/1996 |
| WO | WO 2009/058740 | 5/2009 |
| WO | WO 2011/022808 | 5/2009 |
| WO | WO 2009/078020 | 6/2009 |

OTHER PUBLICATIONS

PhoneGap; http://web.archive.org/web/20110902045616/http://www.phonegap.com/; Sep. 2, 2011; pp. 1-2.*

Appy Pie; http://web.archive.org/web/20130615002921/http://www.appypie.com/convert-website-to-mobile-apps; Jun. 15, 2013; pp. 1-2.*

AppsGeyser; web.archive.org/web/20110324220845/http://www.appsgeyser.com/about/; Mar. 24, 2011; pp. 1-2.*

George Wong; "Apps Builder lets you turn your website into an app"; Feb. 10, 2012; pp. 1-3, web.archive.org/web/20120212202030/http://www.ubergizmo.com/2012/02/apps-builder/.*

Anubavam; http://web.archive.org/web/20111012143319/http://www.anubavam.com/website-to-mobile-app; Oct. 12, 2011; pp. 1-4.* appsbar, "About Us", http://www.appsbar.com/AboutUs.php; 2 pages.* scotthirsch.com, "In the News", http://scotthirsch.com/news.html, 1 page.*

Kevin Casey, InformationWeek, "Appsbar Helps SMBs Build Mobile Apps", Apr. 28, 2011, 6 pages, http://www.informationweek.com/mobile/appsbar-helps-smbs-build-mobile-apps/d/d-id/1097435?* appsbar, "About Us", http://www.appsbar.com/AboutUs.php; 2011; 2 pages.* scotthirsch.com, "In the News", http://scotthirsch.com/news.html, 2011; 1 page.*

Eliot Van Buskirk; "Appsbar Lets Bands Make Apps to Sell Music", Sep. 12, 2011, 2 pages, http://evolver.fm/2011/09/12/appsbar-lets-bands-make-apps-to-sell-music/.*

Abrahamsson, P., et al., "Mobile-D: An Agile Approach for Mobile Application Development", Proceeding OOPSLA, 2004, pp. 174-175.

App Inventor [online], Dec. 30, 2010 [retrieved on Apr. 17, 2012]. Retrieved from the Internet: <URL: http://web.archive.org/web/20101230143103/http://appinventor.googlelabs.com/about/moreinfo/>.

Balagtas-Fernandez, F., et al., "Mobia Modeler: Easing the Creation Process of Mobile Applications for Non-Technical Users", In Proceedings of IUI, 2010, pp. 269-272.

Notification of Transmittal of the International Search Report and the Written Opinion of the International Searching Authority, or the Declaration; International Search Report; Written Opinion of the International Searching Authority, mailed Sep. 27, 2013, for PCT/IB2013/000800.

(56) References Cited

OTHER PUBLICATIONS

Notification of Transmittal of the International Search Report and the Written Opinion of the International Searching Authority, or the Declaration; International Search Report; Written Opinion of the International Searching Authority, mailed Sep. 27, 2013, for PCT/IB2013/000673.

Notification of Transmittal of the International Search Report and the Written Opinion of the International Searching Authority, or the Declaration; International Search Report; Written Opinion of the International Searching Authority, mailed Sep. 27, 2013, for PCT/IB2013/000792.

Notification of Transmittal of the International Search Report and the Written Opinion of the International Searching Authority, or the Declaration; International Search Report; Written Opinion of the International Searching Authority, mailed Feb. 21, 2014, for PCT/IB2013/000585.

Notification of Transmittal of the International Search Report and the Written Opinion of the International Searching Authority, or the Declaration; International Search Report; Written Opinion of the International Searching Authority, mailed Mar. 18, 2014, for PCT/IB2013/000588.

* cited by examiner

SYSTEMS AND METHODS FOR CREATING OR UPDATING AN APPLICATION USING WEBSITE CONTENT

CROSS-REFERENCE TO RELATED APPLICATIONS

The present application is a continuation of U.S. patent application Ser. No. 13/831,111 filed on Mar. 14, 2013. The present application is also related to U.S. patent application Ser. No. 13/831,125 entitled "Systems and Methods for Creating or Updating an Application Using a Pre-existing Application" which was filed on Mar. 14, 2013. The contents of the above-identified applications are incorporated by reference in their entirety as if recited in full herein.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present principles are directed to systems and methods for creating applications, and more particularly, to systems and methods for creating an application, or portion thereof, using website content. In certain embodiments, the applications created or updated with the content of a website may include mobile applications and web applications, including HTML 5 applications.

BACKGROUND OF THE INVENTION

In modern times, businesses, organizations, governmental agencies and other entities often utilize websites and computing applications to further their goals and objectives. For example, a single company may provide a website, a mobile application for a smart phone, a television application for a smart television and even a desktop application that can be installed on a desktop computer or laptop. The information and functionality performed by the company's website is often the same or similar to some extent. For example, the company's website and computing applications may both advertise the company's goods and services, provide a contact form that permits an individual to transmit comments to the company, display a listing of products for purchase, provide a shopping cart which permits someone to add and remove goods to be purchased, or disseminate information on a particular topic.

Despite the overlap in content and functionality between the website and the applications, a company (or other entity) is typically faced with hiring separate developers to handle the creation of the website and the applications. For example, a website development company may be hired to create a website, and a software development company specializing in mobile applications will be hired to create a mobile application for the company. Furthermore, since applications are generally not compatible across different platforms, additional software development expenses will be incurred if the company desires other types of applications (e.g., applications for televisions, kiosks or vehicles) as well. Consequently, the creation of a website and computing applications can be very expensive.

In addition, from the perspective of the software development companies, the creation of computing applications can be an extremely complex and time-consuming task. In order to build an application, a programmer must have a certain level of technical knowledge (e.g., knowledge of programming languages and knowledge of particular hardware devices that execute the application). Moreover, even if a programmer has sufficient knowledge to create an application for one type of particular device (e.g., an iPhone), it is often the case that the programmer does not possess sufficient knowledge to create applications for other types of devices (e.g., Android devices or for a particular type of television). Depending upon the complexity of the application, programmers can spend weeks, months or even years developing a single application.

Hence, there is a need for a software creation tool that has the ability to generate one or more computing applications in an expedited, cost-effective manner that does not require technical knowledge.

SUMMARY OF THE INVENTION

Systems and methods are provided for a platform that facilitates the generation of computing or software applications in an expedited, cost-effective manner. The applications created or updated with the website content may include mobile applications and web applications, including HTML 5 applications. A software development platform may also permit users having little or no programming or technical knowledge to create various types of applications The systems and methods disclosed herein may utilize website content to create or update applications. An input may be received that identifies website content to be utilized in creating or updating an application. In certain embodiments, the input may identify a uniform resource locator (URL) or site map associated with website content. The website content may be analyzed in accordance with a rule set to detect website features associated with the website. This may include analyzing HTML source code, scripting code, stylesheets, and other types of website content. Exemplary website features that are detected within the website content may include multimedia content, social media links, font information, alignment information and hyperlinks, in addition to functional website features such as forms, photo galleries, shopping carts, RSS feeds, Atom feeds, event calendars, checkout pages, and product listings. The detected website features may then be incorporated into the one or more application modules for the application that is being created or updated.

In accordance with certain embodiments, a method is provided for creating or updating an application using website content. An input may initially be received that identifies website content to be utilized in creating or updating the application. The identified website content may be analyzed in accordance with a rule set to detect website features within the website content. The detected website features may then be incorporated into one or more application modules associated with the application.

In accordance with certain embodiments, a system is provided for creating or updating a software application using website content. The system comprises a processor that is configured to receive an input that identifies website content to be utilized in creating or updating the application, and to analyze the identified website content in accordance with a rule set to detect website features within the website. The processor may further be configured to incorporate the detected website features into one or more application modules associated with the application.

In accordance with the certain embodiments, a computer storage medium is provided which comprises program instructions for creating or updating an application using website content. When executed on a computer, the program instructions cause the computer to receive an input that identifies website content to be utilized in creating or updating the application, and to analyze the identified website content in accordance with a rule set to detect website features within the website content. The program instructions may further cause the computer to incorporate the detected website features into one or more application modules associated with the application.

These and other features and advantages will become apparent from the following detailed description of illustrative embodiments thereof, which is to be read in connection with the accompanying drawings.

BRIEF DESCRIPTION OF DRAWINGS

The inventive principles are illustrated in the figures of the accompanying drawings which are meant to be exemplary and not limiting, in which like references are intended to refer to similar or corresponding parts, and in which.

DETAILED DESCRIPTION OF THE EMBODIMENTS

Figure 1:
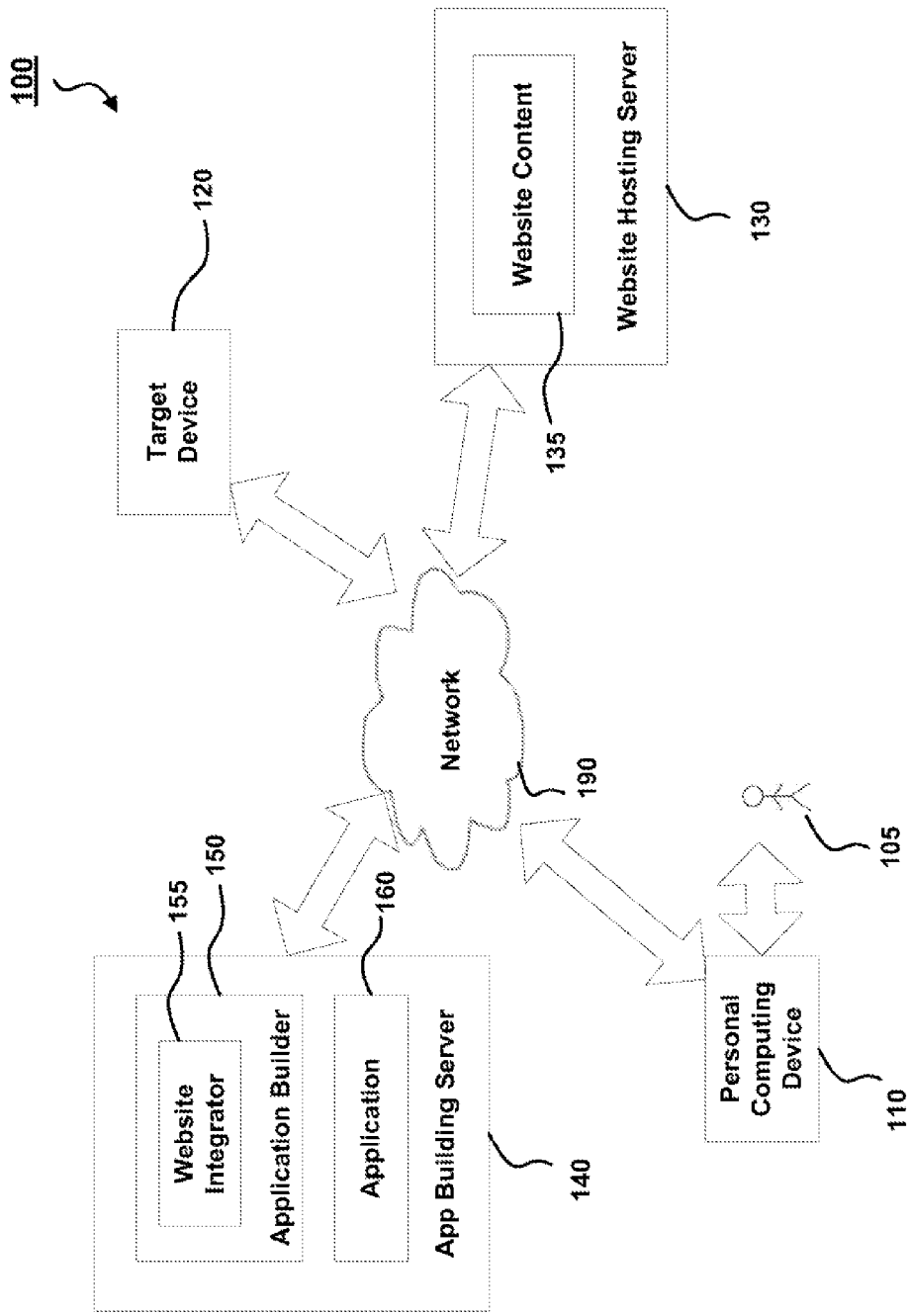
FIG. 1 is a block diagram of a system for generating an application using website content in accordance with certain embodiments.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In accordance with the principles described herein, a software development platform is provided for creating or updating an application, or portion thereof, using website content. In certain embodiments, the software development platform may be integrated with or may use the ones described in U.S. patent application Ser. No. 13/396,392 filed on Feb. 14, 2012 and U.S. patent application Ser. No. 13/396,368 (now, U.S. Pat. No. 8,261,231) filed on Feb. 14, 2012, both of which are herein incorporated by reference in their entirety. For example, the principles disclosed herein with respect to creating or updating applications using website content may be incorporated as a feature of the software development platforms described in these references.

More specifically, in accordance with certain embodiments, a software development and distribution platform and corresponding arrangement may be provided that allows non-technical users and application developers to develop applications through the platform that may be built and compiled to run on multiple mobile operating systems and/or devices and utilize the various device and operating system specific features, without the need for programming knowledge or expertise. Certain of these embodiments allow users to highly customize the applications developed through the platform by selecting and combining various predefined components, features, application designs, and content and/or creating new components, such as app-types and modules. Certain embodiments allow users to deploy applications developed through the platform by submitting the compiled applications to digital distribution platforms associated with one or more types of operating systems and/or devices. Certain of these embodiments, allow the compilation to comprise an identifying reference and/or other basic information, rather than the application data itself, which may be used to retrieve application data from a remote source, and build and configure the application when end users download or execute the application. Certain embodiments allow users and developers to modify or update the applications and their content directly through the development platform.

A user may initially identify the website content that will be used to create or update the application. In certain embodiments, the user may be permitted to identify one or more web pages that can be utilized in creating or updating the application, or the user can identify an entire website that is to be utilized in creating or updating the application. The website content may be identified by specifying a uniform resource locator (URL) for a particular webpage or for a particular website (e.g., by specifying a URL that identifies the index page or site map for the website), by selecting the website from a list of websites, or in other ways. In certain embodiments, the identified website content may be retrieved over a network (e.g., the Internet) from a server hosting the website and stored on an app building device that is configured to analyze the website content and create or update an application using the website content.

The website content (e.g., HTML code, text, images, videos, scripting code, style sheets, etc.) may be scanned by the app building device according to a rule set in order to detect the presence of particular features within the website content. Generally speaking, the rule set comprises a set of rules for detecting website features. The rule set may utilize a variety of different analysis tools (e.g., regular expressions, string querying functions, crawlers, etc.) to scan the website content and detect website features.

Any type of file or data associated with a website or web page may be analyzed to detect the presence of website features. In certain embodiments, the source code for a web page may be analyzed in accordance with the rule set to detect the website features. This may include analyzing particular HTML tags (e.g., <title> tags, <form> tags, <input> tags, <div> tags, <table> tags, <body> tags, <head> tags, <font> tags, or any other tag in any version of the HTML specification) within the source code, attributes of the HTML tags, or event triggers associated with the HTML tags (e.g., associated with the onClick HTML event, on MouseOver HTML event or any other type of event). Even further, the analyzing operations may include analyzing scripting code (e.g., JavaScript code, PHP code or other types of scripting code) included in the source code for a web page or in separate files within a web directory for the website, as well as analyzing style sheets (e.g., CSS style sheets) that may be utilized to control the look or appearance of a website or web page.

The rule set may be capable of detecting various types of website features. For example, the rule set may include rules for detecting multimedia data (e.g., text, images, videos, audio recordings, or other types of multimedia data) that is displayed on a website. The rule set may further include rules for detecting fonts utilized on the website, sizes of different website elements (e.g., font size, image size, table size, or other size related information), alignment data (e.g., alignment of text, images, tables, etc.), hyperlinks (including hyperlinks to web pages associated with social media website such as Facebook™, Twitter™ or LinkedIn™) and associated URLs, or any other feature that may be derived from an HTML tag, XML tag or markup tag. The rule set may also be utilized to detect more complex functional website features that are included with the website content. For example, the website content may be analyzed to detect input forms, photo galleries, shopping carts, RSS/Atom feeds, event calendars, checkout pages, product listings (e.g., included in an auction), contact lists, blogs or any other type of functional feature that may be provided by a website. In certain cases, these features may be identified by analyzing HTML tags, scripting code and/or text that is provided on a website.

After the website features have been detected, a user may be permitted to select the website features that are to be incorporated into an application or portion of an application that is being created or updated. In certain embodiments, the detected website features may be presented to the user on an interface and the user may be permitted to identify the website features that are to be included in the application by selecting/unselecting check boxes or other types of input elements (e.g., radio buttons).

In certain embodiments, an application module may be created for each web page that is analyzed, and the application module may include all of the website features associated with the web page. The application module may represent an interface for the application being created or updated that corresponds to the web page. For instance, if a contact page for a website (e.g., which includes contact information and a contact form for submitting comments) was analyzed, a corresponding application module may be created that includes the website features that were detected on the web page (e.g., which includes the contact information and contact form). The user can select to include or exclude the entire application module from the application, or to include or exclude particular website features that are associated with the application module.

The manner in which the website features are incorporated into the application being created may vary. In certain cases, the features may simply be copied from the website and incorporated into the application. For example, any multimedia data that is displayed on a website may be copied and incorporated into the application. Other basic types of website features (e.g., titles, headings, fonts, etc.) can also be incorporated into the application in a relatively straightforward manner by extracting the information associated with applicable HTML tags and/or CSS style sheet data and utilizing the extracted information to populate the application parameters.

In other cases, preassembled modules may be added to applications in order to incorporate particular types of website features (e.g., input forms, photo galleries, event calendars, RSS or Atom feeds, etc.). For example, a preassembled module may be provided for incorporating an input form into an application. Thus, if an input form was detected on the website, then the preassembled module for the input form may be added to the application. Once added, the preassembled modules may automatically be customized or tailored to reflect the input form on the website (e.g., the form may be customized to include the same input fields as the form on the website). Preassembled modules may be utilized to incorporate any website feature described herein.

In certain embodiments, the website content may initially be utilized to create or update a web application (e.g., an application implemented in HTML 5 or other web-based language). After the web application is generated from the website content, a user may specify that the web application is to be converted or translated into a different application for a specific device (e.g., converted to an application that is compatible with a particular type of smart phone or smart television).

In certain embodiments, the website content may initially be utilized to create or update a generic application. The generic application may represent an application having a standardized format that stores the features for the application in a uniform manner to facilitate conversion of the generic application into other types of native applications (e.g., applications for mobile devices such as an iPhone™ device, Android™ device or Blackberry™ device). Thus, after the generic application is generated using the website content, a user may specify that the generic application is to be converted or translated into a different application for a specific device (e.g., converted to an application that is compatible with a particular type of smart phone or smart television).

Figure 4:
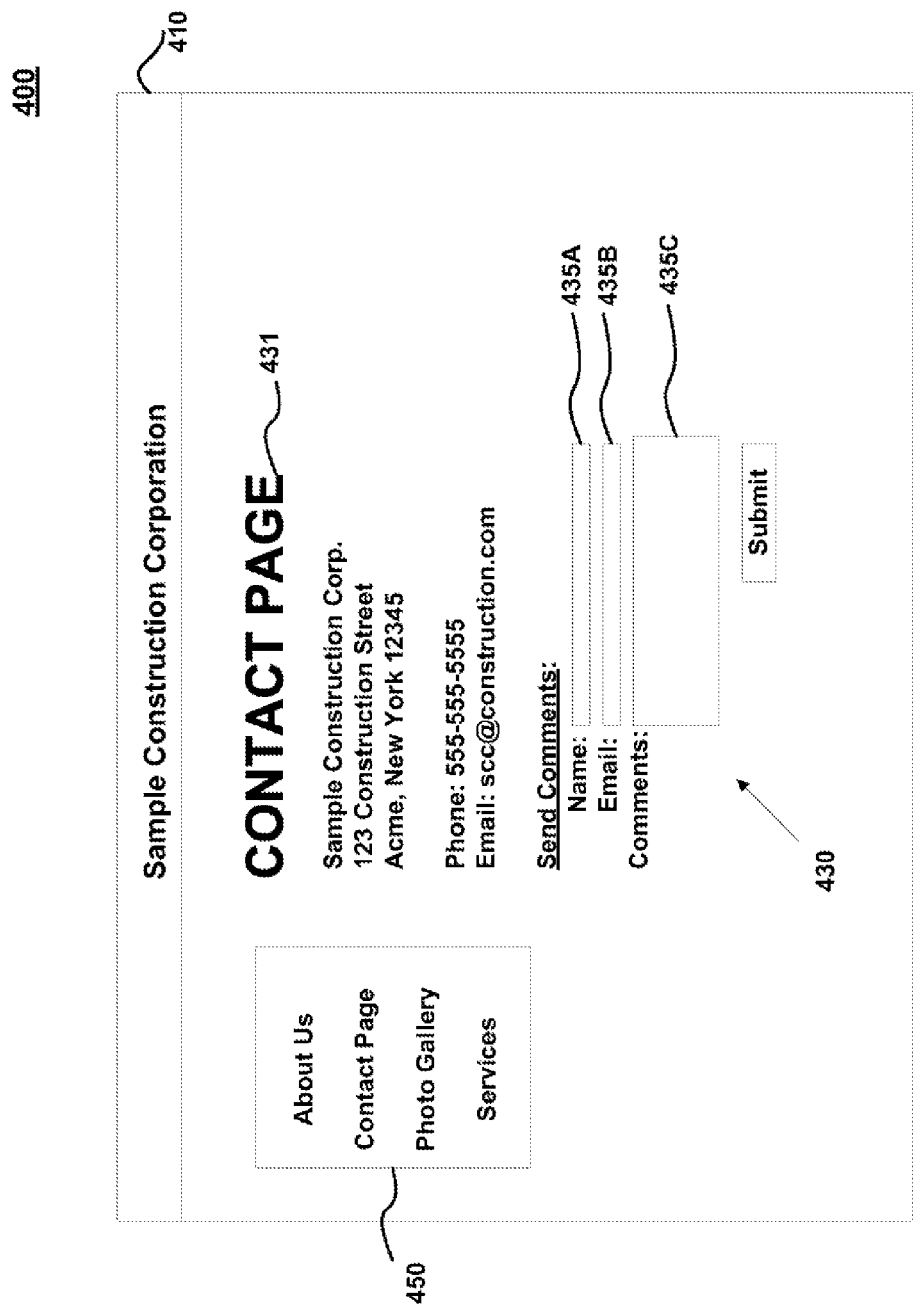
FIG. 4 is a web page that may be utilized to create the application module displayed in the simulation window of FIG. 3C in accordance with certain embodiments.

In certain embodiments, the generic application which is created or updated using the content of a website may be represented and/or stored using the exemplary data model described in FIG. 4 (along with the corresponding description of this figure in the specification) of U.S. patent application Ser. No. 13/396,392 and U.S. patent application Ser. No. 13/396,368 (now, U.S. Pat. No. 8,261,231), both of which are incorporated by reference in their entirety.

For example, in utilizing such a data model, the application components, design elements, contents, settings, and other data utilized by developers to design, create, modify, and customize applications through the development platform and corresponding systems and methods described and illustrated herein may be organized and stored in a relational and/or hierarchical manner. In certain of these embodiments applications developed through the platform may include and/or be represented by a set of application components, content element, and/or design elements, each of which, in turn, may include, or be associated with, one or more other application components, content elements, and/or design elements and so on. For example, each application may be associated with an app-type, which includes one or more modules, each of which, in turn, includes one or more layouts and one or more features.

In certain embodiments, the application components, design elements, content elements, and other data, as well as their relationships to each other, may be represented and stored in a database, such as relational database. In certain other embodiments, these relationships and the application data may be represented and/or stored in any other suitable format and/or medium, such as in tables, trees, sets of links, or other similar structures. By storing this information in a relational manner, applications developed through the development and distribution platform can be easily stored, retrieved, built, and updated simply by representing each application through a series of relationships between the application's components, elements and other data. Moreover, this data model or architecture enables new application components, content elements, and design elements created or customized by developers or other third parties to be added to the development and deployment platform and used by developers in the development of future applications.

In other embodiments, a user may specify the type of application that is to be created from the website content. For example, the user may be provided with a list of available application types that are specific to particular devices, operating systems and/or device platforms. Hence, the user may specify that the application being constructed from the website content is an application intended to be executed by a particular mobile phone, desktop computer, television, motor vehicle device, aircraft device, kiosk or other device. The user may select additional design parameters associated with constructing the application such as the programming language that the application will be implemented in.

If the user is updating an existing application using the website content, the system may automatically recognize the application type for the application that is being updated. In other embodiments, a user may specify the application type for an application (e.g., by selecting from a list of application types) that is being supplemented with the website content. Regardless of how the application type of an existing application is determined, the application is supplemented with the website content in a manner that is compatible with the application type for the application.

In certain embodiments, a set of conversion templates may be utilized to transform or convert the website content into different types of applications. For example, separate conversion templates can be provided for converting or translating the website content into an HTML 5 application, an iPhone application, an Android application, a NetTV application, a Facebook application, or other types of applications. The conversion templates may indicate how a particular website feature (e.g., input form, calendar, shopping cart, etc.) which was detected within the website content is to be incorporated into the application being constructed. For example, the conversion templates may specify rules for copying a website feature into an application or for incorporating a website feature utilizing a preassembled module. The conversion templates may provide a means for converting source code (e.g., HTML mark up or scripting code) into a programming language that is compliant with a particular target device and which is compatible with development frameworks provided for particular devices.

Conversion templates may also be utilized to convert an application having a first format into an application having a second format. Thus, website content may initially be converted into a specific application type. After this initial conversion, the application created from the website content may be converted or translated into an application having a second format. For example, the website content may be utilized to create an initial application in a generic application format (e.g., a generic format which includes a listing of the application features). A conversion template may then be applied to convert the application having the generic application format into an application format for iPhone application. As another example, the website content may initially be utilized to create a web application (e.g., an HTML 5 application). A conversion template may then be applied to convert the web application into an Android application or application for particular type of television system. Thus, the conversion templates may also be utilized facilitate this type of conversion.

In certain embodiments, a site map for a website may be utilized to assist with the construction of the application. For example, a site map may be scanned to determine the names and URLs of the web pages that are to be incorporated into the application. A separate application module or interface may be created for each web page identified by the site map. The website features included on a particular web page may be utilized to populate the module that has been created for the web page.

Rather than, or in addition to, utilizing a site map to determine the web pages that are to be incorporated into an application, a web crawler or web bot may crawl the hyperlinks on a website to determine the web pages that comprise the website. In this case, a set of crawling rules can be utilized to limit the scope of the crawling operation. The crawling rules may limit the number and the type of modules created for the application. For example, the scope of the crawling operation may be limited to web pages that share a particular domain name or may be limited only to web pages that are identified by hyperlinks on the index page of a website. Other types of crawling rules may also be utilized.

After the site map and/or crawler is utilized to determine the set of modules that will be created for the application from the website content, the user may select the web site features and/or application modules that are to be included in the application. The website features (e.g., text, input forms, images, shopping carts, headings, etc.) may then be incorporated into the modules that are created for the application. Once the modules are populated with equivalent or similar features as those which were detected on the website, a user may further customize and edit the application and the associated modules. For example, the user may be presented with tools that permit the user to add, edit or delete particular website features that have been added to the modules. Fonts, color schemes, and location of website features on the module interfaces can also be altered. Multimedia items, such as text, images, and videos, can also be added, deleted or edited.

In certain embodiments, one or more web pages (included in the website that was utilized to create the application) are converted into separate modules for the application. The user may further add preassembled application modules to the application in order to supplement the functionality of the application. For example, the user may add preassembled modules to the application that provide a calendar of events, shopping cart, checkout page, photo gallery, upload form, or other website features, even if such features were not part of the website that was utilized in creating the application. These additional modules which are added to the application may also be customized by the user. For example, the user may add text, images or other types of multimedia data to populate the modules or select from a list of options for customizing the modules.

After a user has finished creating or updating an initial version of the application, the user may utilize a synching feature that facilitates the automatic updating of an application in response to detecting updates on a website or web page. The user may be permitted to select an option that specifies whether the user would like an application to be synched with a website or web page that was utilized to create the application. Assuming the user selects the option, an application or application module would automatically be updated to reflect changes that are made to the website or web page in the future. For example, if website features were added to a webpage or website at some later time, the application would automatically be updated to include these features. To determine whether a website or web page has been updated, the website or web page that was utilized in creating the application or application module may be periodically reviewed, or may be reviewed in response to a command or request to check for updates.

It should be apparent that the application creation techniques described throughout this disclosure do not require a user to have any technical knowledge or programming knowledge. A user may simply identify a website or web page, and the website content associated with the identified website or web page may utilized to create or update an application. A set of build tools may permit the user to further customize the application and supplement the application with additional content. All of this may be performed in a user-friendly manner by providing some basic input (e.g., by selecting checkboxes or typing data into a text input field), and without requiring the user to write a single line of program code.

Embodiments described herein may be hardware-based, software-based and preferably comprise a mixture of both hardware and software elements. Thus, while the description herein may describe certain embodiments, features or components as being implemented in software or hardware, it should be recognized that any embodiment, feature or component that is described in the figures or description of the present application may be implemented in hardware and/or software. In certain embodiments, particular aspects are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system 100 is disclosed for creating or updating an application using website content in accordance with certain embodiments. As shown therein, a personal computing device 110, target device 120, website hosting server 130 and app building server 140 are connected to a network 190. Each of these devices may be configured to communicate via wired or wireless links, or a combination of the two. Each of these devices may also include one or more processors (e.g., central processing units) and one or more non-transitory computer storage devices (e.g., RAM, ROM, PROM, SRAM, etc.). The network 190 may be any type of network such as one that includes the Internet, a local area network (LAN), a wide area network (WAN), an intranet, etc.

A user 105 may operate the personal computing device 110 to communicate with the app building server 140 for the purpose of creating or updating an application 160. The app building server 140 includes an application builder 150 that may provide a set of build tools for constructing an application 160. Amongst other things, the build tools may permit the user 105 to design the application 160 by adding multimedia content (e.g., text, images, video, audio, etc.) to the application, designing the appearance of the application and adding functionality to the application.

The target device 120 may represent any device that is capable of executing an application 160. The application builder 150 may permit the user 105 to design and construct applications 160 for any type of target device 120 including, but not limited to, mobile devices (e.g., applications for an iPhone, Android device or Blackberry), televisions (e.g., applications for NetTV, Google TV device, Apple TV device, or particular televisions such as Samsung 8000 Smart TV), kiosks, desktop computers, or computing devices that provide access to applications in cars, planes or other vehicles.

To assist with building an application 160, the application builder 150 may include a website integrator 155. The website integrator 155 may analyze website content associated with a web page or website on a website hosting server 130. In certain embodiments, the website integrator 155 may create or update one or more application modules for the application 160 using the website content. For example, the website integrator 155 may determine that modules should be created for one or more of the web pages comprising a website (e.g., the Contact page or the About Us page on the website). The website integrator 155 may further be configured to scan the website content associated with a web page or website to detect one or more website features (e.g., multimedia data, input forms, photo galleries, shopping carts, etc.). The website features may then be incorporated into one or more modules that are being created for the application 160. In the case that an application is being updated, any application modules which were previously created may be updated with the detected website features. Further details regarding the manner in which website content may be utilized to create or update an application 160 are discussed in further detail below.

The personal computing device 110 may represent a desktop computer, laptop computer, mobile phone, tablet device, or other type of computing device. The personal computing device 110 may include a display and one or more input devices (e.g., keyboard, microphone, camera, video camera, analyzer, joystick, remote control device, etc). The personal computing device 110 may also include a web browser that is able to access the application builder 150 on the app building server 140. A user may manipulate interfaces served to the web browser by the app building server 140 in order to interact with the application builder 150 in constructing and/or updating applications 160.

The app building server 140 may generally represent any type of computing device. In certain embodiments, the app building server 140 comprises one or more mainframe computing devices that execute a web server configured to communicate with personal computing devices 110 over the Internet. A computer storage medium on the app building server 140 may store applications or software code that is configured to provide assistance to users in performing tasks related to creating or updating an application. Specifically, the app building server 140 may be configured to provide the application builder 150 to users 105 via an interface displayed on the personal computing devices 110. As mentioned above, the application builder 150 on the app building server 140 may include a website integrator 155 that is configured to incorporate website content into an application 160 or to supplement an existing application with the content from a website or web page.

In certain embodiments, the website content may be stored on a computer storage medium provided by a website hosting server 130. Like the app building server 140, the website hosting server 130 may represent one or more mainframe computing devices that execute a web server or other type of computing device.

It should be noted that the system in FIG. 1 is merely meant to demonstrate an embodiment of an operating environment that can be utilized in conjunction with the principles disclosed herein, and should not be construed as limiting in any manner whatsoever. The particular configuration in FIG. 1 can be altered in numerous ways without departing from the principles herein.

For example, the manner in which the application builder 150 is provided to the user 105 may vary. Rather, than making the application builder 150 accessible to a user 105 over a network 190, the application builder 150 may represent an application that resides on the personal computing device 110 being operated by the user 105. In such embodiments, the application builder 150 residing on the personal computing device 110 may directly access website content 135 over the network 190 without interacting with a app building server 140. Thus, any functionality of the app building server 140 which is described herein can alternatively be implemented by a personal computing device 110.

Moreover, in certain embodiments, it may not be necessary to access website content 135 over a network 190. For example, a personal computing device 110 may store website files or website content directly on the personal computing device 110, or such may be obtained form a external storage medium (e.g., CD, DVD, USB flash drive, external hard drive, etc.). In such embodiments, an application builder 150 stored on the personal computing device 110 can convert the website content 135 into an application 160 without accessing the website content over the network 190.

Even further, although it may be preferable to have one or more target devices 120 connected to the network 190 in order to transfer an application 160, or updates to an application, directly to the target device 120 after the application 160 has been created, it is not necessary for the target device 120 to be connected to the network 190. The application 160 or associated updates may be transferred to the target device 120 in other ways (e.g., by downloading or storing the application on an external storage medium and utilizing the storage medium to transfer the application or associated updates to the target device 120).

It should also be understood that while the disclosure herein may primarily discuss utilizing website content 135 to create, generate, or build an application, it should be understood that the principles discussed herein may also utilize website content 135 to update or supplement an existing application. Thus, any reference to creating, generating or building an application should also be understood to apply to updating or supplementing an existing application.

Based on the above, it should be apparent that the system 100 illustrated in FIG. 1 may be varied in numerous other ways in addition to those modifications explicitly mentioned in this disclosure.

Figure 2:
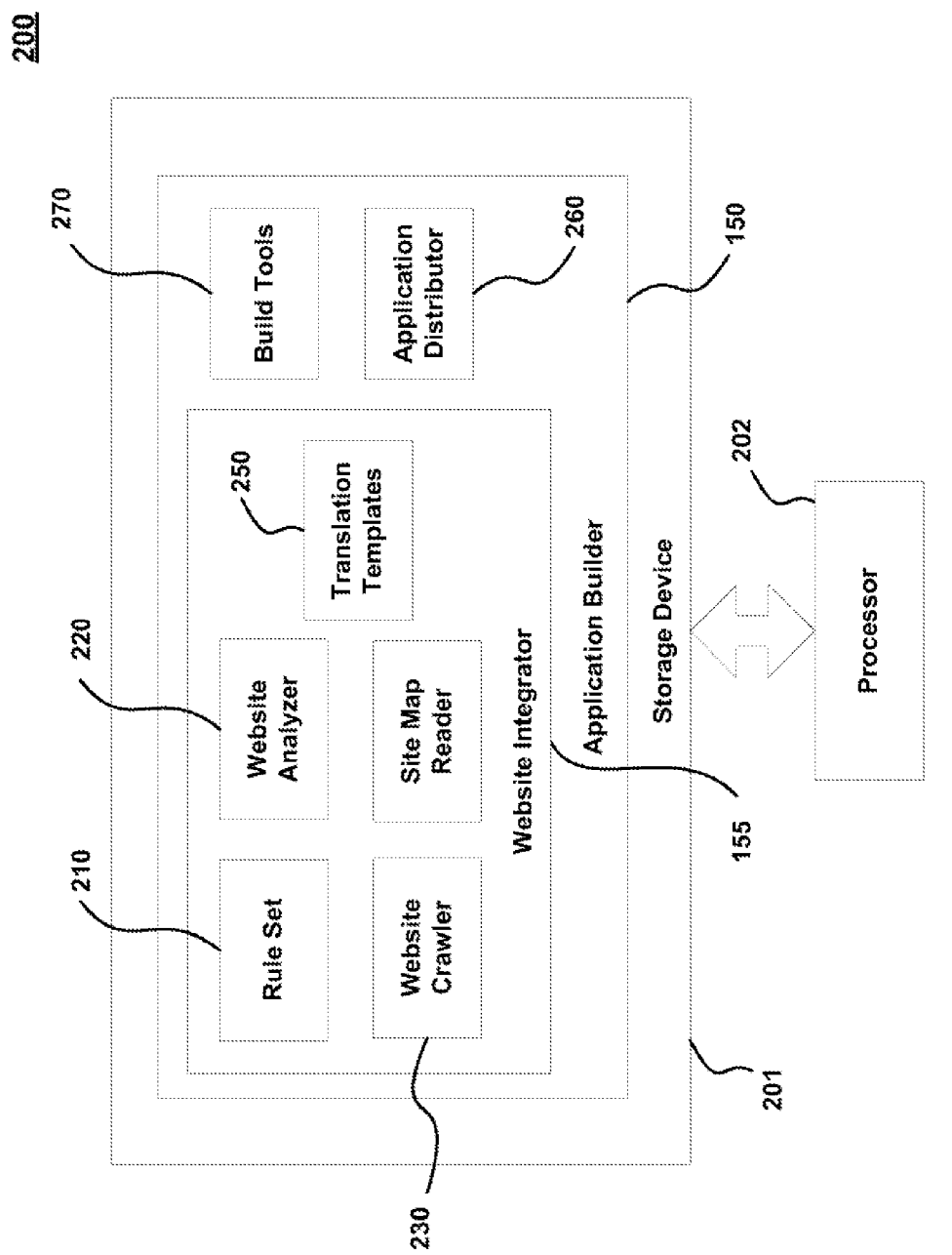
FIG. 2 is a block diagram illustrating a detailed view of an application builder in accordance with certain embodiments.

Moving on to FIG. 2, a detailed view of a system 200 for providing an application builder 150 is disclosed in accordance with certain embodiments of the present invention. As shown therein, a plurality of software components (e.g., website integrator 155, build tools 270, application distributor 260, etc.) comprising computer readable software instructions are stored on a computer storage device 201 (e.g., RAM, ROM, PROM, SRAM, etc). The storage device 201 is in communication with one or more processors 202 that may be configured to execute the instructions associated with software components.

It should be noted that although the components on the storage device 201 may be described throughout this disclosure as software modules, such is not necessary. As explained above, embodiments described herein may be hardware-based, software-based and or a mixture of both hardware and software elements. Furthermore, while the components may be illustrated as separate and distinct components, it should be recognized the components can be combined in any manner (e.g., all of the components may be executed as a part of a single program or as separately executing processes or threads) and that the functions performed by these components may overlap in some instances. To demonstrate the functionality performed by these components, reference will be made to FIGS. 3A-3C, which disclose exemplary interfaces associated with providing an application builder 150.

Amongst other things, the application builder 150 includes a website integrator 155, an application distributor 260 and a set of build tools 270. The website integrator 155 may be configured to analyze website content 135 and utilized the website content 135 to create or update, an application 160 that may be executed by a target device 120. A user 105 may initially select or identify website content 135 that is to be used. For example, the user may identify URLs for one or more web pages that may be utilized to create or update an application 160. In certain embodiments, the user may specify that the website content 135 for an entire website should be utilized in creating or updating an application 160. In this case, the website may be selected by specifying the URL of the index page for the website, or by specifying the URL of a site map for the website.

A user may identify website content 135 to be incorporated into a website in other ways as well. For example, in the case that the website content 135 is not publicly available over the Internet (e.g., is stored locally on the personal computing device 110), a user 105 may upload files to the app building server 140 or identify the locally stored files in other ways. In addition, it should be recognized that a user may specify multiple sources of website content 135 to be utilized in creating or updating an application 160. For example, the user may specify that website content from a variety of different websites may be utilized to create or update a single application. Regardless of how a user identifies the website content 135, some or all of the identified website content 135 may be retrieved over a network 190 (e.g., the Internet) from a website hosting server 130 and stored on a app building server 140 or device that is configured to convert the website content 135 into an application 160 or portion of an application 160.

In the case that a user has identified a website that will be used in creating or updating an application 160, a website crawler 230 and site map reader 240 may be utilized to determine the application modules that are to be created (or updated) for an application 160 using the content from the website 145. For example, the website crawler 230 and site map reader 240 may identify one or more web pages that are to be converted into modules for the application 160 or one or more web pages that may be used to update modules that have already been created. In certain embodiments, each module that is created may be associated with a particular web page and populated with the website features included on the associated web page.

Generally speaking, a site map is an file (typically, an XML file) that lists the names and URLs for a website along with additional metadata about each URL (e.g., when it was last updated, how often it usually changes, the names or titles of a web page, and how important it is relative to other URLs in the site). Thus, in certain embodiments, the site map reader 240 may scan this file to determine the web pages that are to be converted into modules for the application 160, and may create a separate application module for one or more of the web pages identified in the site map. The names or titles of the web pages may be utilized to name the application modules that are created.

The web site crawler 230 may also be utilized to determine the web pages that are to be incorporated into an application 160 or utilized to update an application 160. In certain cases, the web site crawler 230 may be utilized if a site map is unavailable for a particular website, or may be utilize to supplement the data that is extracted from the site map. To determine the web pages that are to be used in creating or updating application modules for an application 160, the web site crawler 230 may initially traverse or crawl the hyperlinks on a website in order to identify the web pages which comprise the website. The website crawler 230 may include a set of crawling rules that determine the scope of the crawling operation. For example, a crawling rule may be included which specifies that only web pages having a particular domain name should be utilized to create or update application modules for the application 160. Another crawling rule may specify that the application 160 should only utilize web pages that are identified by hyperlinks on the index page of a website. Other types of crawling rules may be utilized as well. In certain embodiments, a user may be permitted to select and/or define the crawling rules which are applied. Regardless of which particular crawling rules are applied, the crawling operations of the web site crawler 230 may be utilized to identify web pages that are to be converted into modules for the application 160.

After the website integrator 155 has determined the web pages that are to be utilized in creating or updating the application 160, the website analyzer 220 may analyze or scan the website content (e.g., the HTML source code, scripting code, style sheets, multimedia data, or other type of website content) associated with the identified web pages to identify website features. For example, the website analyzer 220 may analyze website content including multimedia content, HTML tags (e.g., <form> tags or <href> tags), event triggers (e.g., onClick HTML event or on MouseOver HTML event), style sheets, scripting code and other types of website content.

The website analyzer 220 may utilize a rule set 210 in analyzing the website content to detect the website features. The rule set 210 may represent a set of rules or policies which are utilized to identify website features which are present in the website content. For example, the website analyzer 220 may identify website features such as multimedia content that is displayed on the website, functional website features (e.g., forms, RSS feeds, scrollers, photo galleries, shopping carts, etc.) that are provided by the website, font characteristics for text on the website (e.g., size, style, etc.), titles of web pages or sections of web page, navigation menus utilized by the website, or any other type of website feature that may be displayed on a website. After the scanning operations have been performed, the website integrator 155 may copy particular types of website features (e.g., text and images) into the application 160 or may incorporate equivalent or similar features into the application 160 (e.g., using the preassembled modules).

In analyzing the website content 135, the website integrator 155 utilize a variety of different analysis tools (e.g., regular expressions, string querying functions, crawlers, etc.) to detect website features. For example, in order to detect images that are present on a web page, the rule set 210 may include rules which utilize regular expressions or string querying operations to search the website content (e.g., the HTML source code) for particular image file extensions (e.g., .jpg, .gif., or .png) and/or which search the website content for HTML image tags (i.e., <img> tag).

Likewise, in order to detect the presence of an input form on a website, the rule set 210 may include one or more rules that may be utilized to search the website content for an input form. For example, the rule set 210 may include rules which define regular expressions (or other searching tools) for detecting the tag associated with the beginning of an input form (i.e., <form> tag) and the tag associated with the end a form (i.e., </form> tag). The rule set 210 may further include rules that search for any HTML input tags (i.e., <input> tags) occurring between the beginning and ending form tags which may identify input elements (e.g., text boxes, check boxes, radio buttons, hidden input elements or other types of input elements) associated with the form.

Some or all of the website features detected in the website content may be incorporated into the application 160 that is being created or updated. In certain embodiments, a set of conversion templates may be utilized to convert the website content 135 into different types of applications 160. Separate conversion templates can be provided for converting or translating the website into an HTML 5 application, an iPhone application, an Android application, a NetTV application, a Facebook application, an application for a particular type of kiosk, an application for used in a vehicle device (e.g., car device or plane device), and other types of applications.

In some instances, the conversion template 250 may include functions for converting or translating the source code (e.g., HTML and scripting code) associated with a web page or website into another language associated with a particular application type. For example, in that case that website content is being converted into a web application, a conversion template 250 may be utilized for converting the source code into an HTML 5 application that may be executed in a web browser. As another example, in the case that a website is being converted into an iPhone application, a conversion template may be selected for converting the website source code into an application that is written in programming language such as Objective C. This conversion template 250 for converting website source code to an iPhone application may provide instructions for utilizing a development framework, such as the Cocoa Touch API, which is provided to assist developers in constructing applications for the iPhone.

A conversion template 250 for a particular type of application may indicate how a website attribute or feature (e.g., text, images, input form, calendar, RSS feed, shopping cart, etc.) which was detected in the website content is to be incorporated into the particular application type associated with the template. For example, the conversion templates 250 may specify rules for directly copying a website feature into an application or for utilizing a preassembled module to incorporate a website feature into an application.

The manner in which the website features are incorporated into the application being created may vary depending upon the complexity of the website feature. Less complex website features, such any multimedia data, may be incorporated into the application by copying the data directly into the modules of the application or by including a reference to the multimedia data in the modules. For example, an image can be directly copied into an application 160 by copying the file identified by the "src" attribute within an image tag (i.e., <img> tag). Rather, than copying the image, the application 160 may simply include a reference to the location of the image file as identified by the URL.

Likewise, the conversion templates 250 may be able to extract other types of website features (e.g., titles, headings, fonts, etc.) from HTML tags (and their associated attributes) in a relatively simplistic manner by utilizing regular expressions. The extracted information associated with the website feature can then be utilized to define or populate appropriate parameters for an application module. For example, if an application module was created for a web page titled "Homepage", the title may be extracted from the website content (e.g., by extracting the information between the <title> and </title> tags) and utilized to populate a parameter for naming the application module. Similarly, to determine a font that should be applied to text that has been extracted from a website, the conversion template 250 may define rules for detecting the font tag (i.e., <font>) immediately preceding the text and extracting the relevant attributes of the font tag (e.g., extract the "face" and "size" attributes within the font tag). The extracted attributes that may then be utilized to assign values to parameters or variables for the application 160 which define the font that is to be utilized.

In some embodiments, preassembled modules may be utilized for incorporating website features into an application 160. These modules may be particularly useful when incorporating complex or functional website features into an application 160 that is being created or updated. Accordingly, it may be recognized that certain features will commonly be detected on a variety of websites, such as input forms (e.g., which are often found on a contact page of a website or on a survey page of a website), photo galleries, event calendars (e.g., which provide a listing of events along with times and dates for the events), RSS feeds, or product listings (e.g., which list products and/or services that are being sold along with related data such as pricing information and product descriptions). Since these features are common on many websites, preassembled modules may be provided for each of these features for a variety of different application types.

For example, in the case of an input form, separate preassembled modules may be provided for adding an input form to HTML 5 application, iPhone application, Android application, NetTV application, Autonet application, or other type of application. If the user 105 was creating an HTML 5 application from the website content, a preassembled module for providing an input form in an HTML 5 application may automatically be selected and added to the user's application in response to the website analyzer 220 detecting an input form on the website. The website content may then be utilized to customize the preassembled module that was added. For example, the name of the particular fields of the input form (e.g., name, email address, comments, etc.) and the attributes of the input fields (e.g., color or size of text boxes) can be customized to mimic the attributes of the input form that was included on the website. This may be performed by extracting information from the attributes of form tags (i.e., <form> tag) or input tags (i.e., <input> tags), or by extracting text that immediately precedes or follows these tags. In doing so, the preassembled module associated with the input form may be customized or tailored to provide an input form for the application which is the same or similar to the form located on the website.

As another example, suppose that an event calendar was detected on a website that was being transformed into an iPhone application. In this case, a preassembled event calendar module specifically designed for an iPhone application may be added to the iPhone application being created. Thereafter, the dates and times (and other event information) specified by the event calendar located on the website may be extracted and utilized to populate the preassembled module for the event calendar.

Preassembled modules may be provided for nearly any type of website feature. For example, preassembled modules can be provided for shopping carts, photo galleries, video galleries, product listings or any other type of website feature that may be included in an application 160. Likewise, to assist with converting a website into an application 160, any of the preassembled modules can be customized or tailored with the information from the website content in a similar manner to the examples described above.

In addition to transforming website content into an application, the conversion templates may also be utilized to convert an application 160 having a first application type into an equivalent or similar application 160 having a second application type. As mentioned above, in certain embodiments, website content may initially be incorporated into a particular type of application 160 (e.g., a web application implemented in HTML 5) and then the user 105 may be provided with options for converting the initial application into other types of applications (e.g., Android application or Autonet applications for vehicles). Thus, after the initial application is generated, the conversion templates may be utilized to convert or translate the initial application 160 into different types of applications 160. To accomplish this, the conversion templates may indicate how application features (e.g., text, images, input forms, calendars, RSS feeds, shopping carts, etc.) which are present in the first application are to be incorporated into a corresponding second application having a different application type. This may be performed in a similar manner to that which is described herein with respect to converting website features into features of an application (e.g., by detecting features of the first application and incorporating the same or similar features into the second application).

After all the contents of a website have been incorporated into modules for the application 160, the build tools 270 may permit a user 105 to customize (e.g., add, delete or modify) the application modules and/or website features that have been incorporated into the application 160. This may include modifying the content, appearance or functionality provided by the application modules. The build tools 270 may further permit the user 105 to add new modules that are not derived from the website content 135.

Once the user 105 is done customizing the application 160 and the application 160 is finalized, the application distributor 260 may assist the user 105 with distributing the application 160. For example, the application distributor 260 may transmit the application 160 to a target device 120 over a network 190. The application distributor 260 may also be configured to submit the application 160 to one or more application marketplaces that permit individuals to download and/or purchase applications. Exemplary application marketplaces may include the Android Market, the Apple App Store, or any other service that permits users to download and/or purchase applications 160.

Figure 3A:
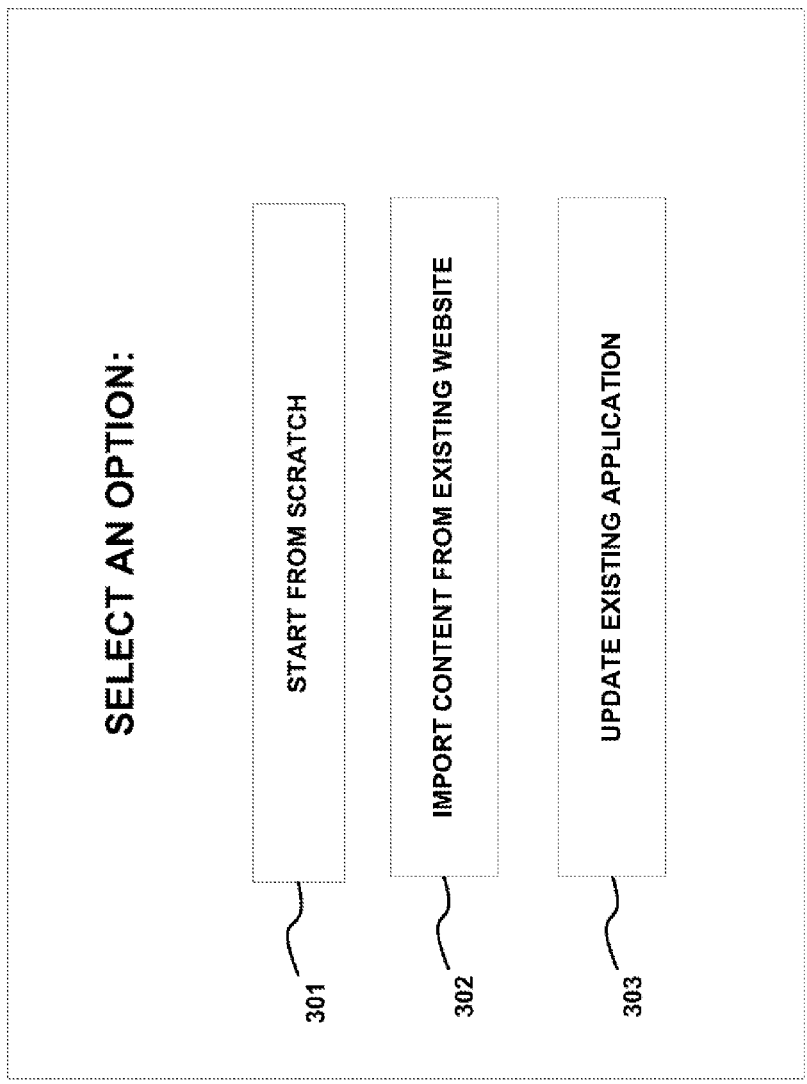
FIGS. 3A-3C illustrate exemplary interfaces that may be provided by an application builder to create an application using website content in accordance with certain embodiments.
Figure 3B:
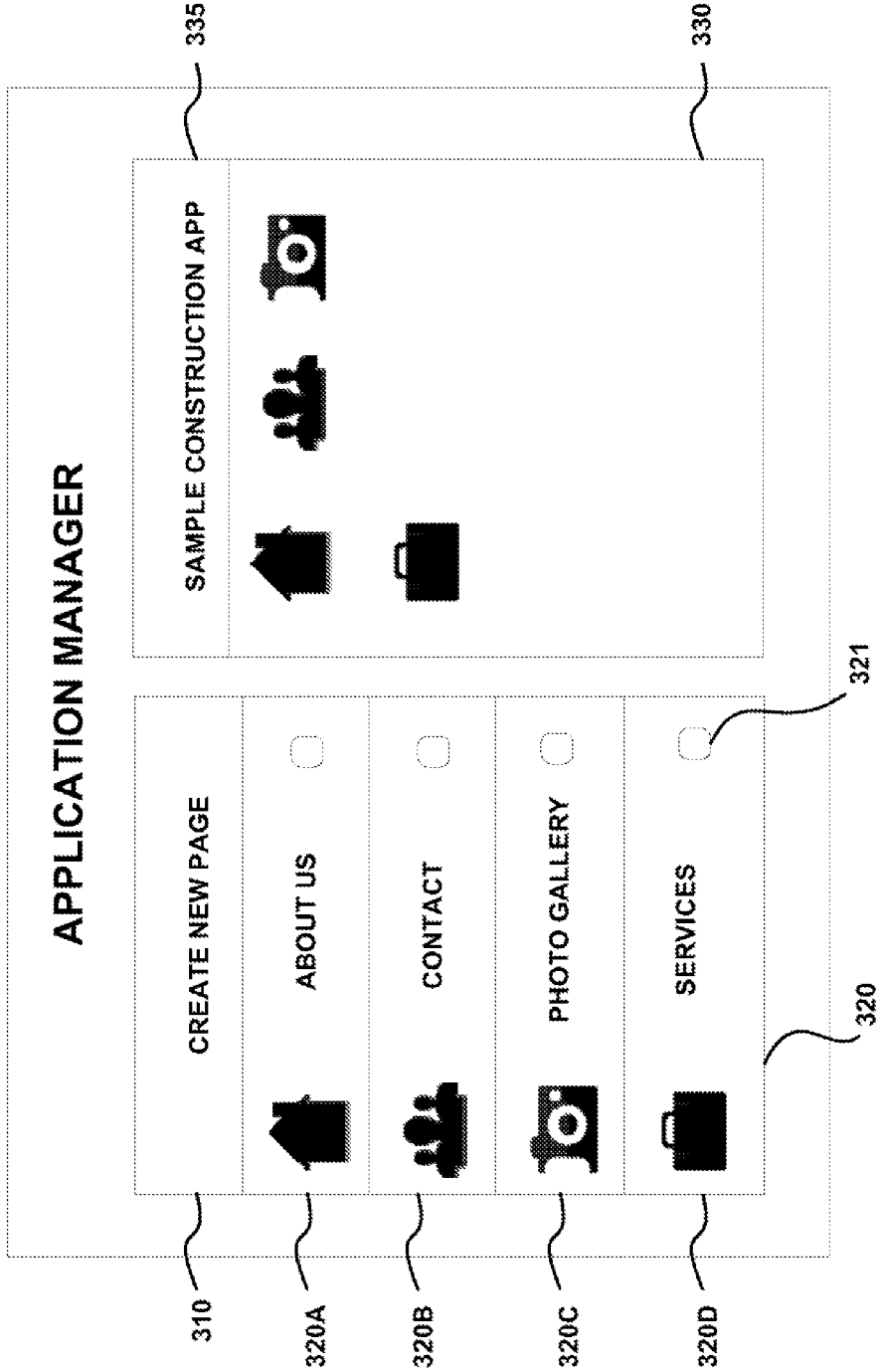
Figure 3C:
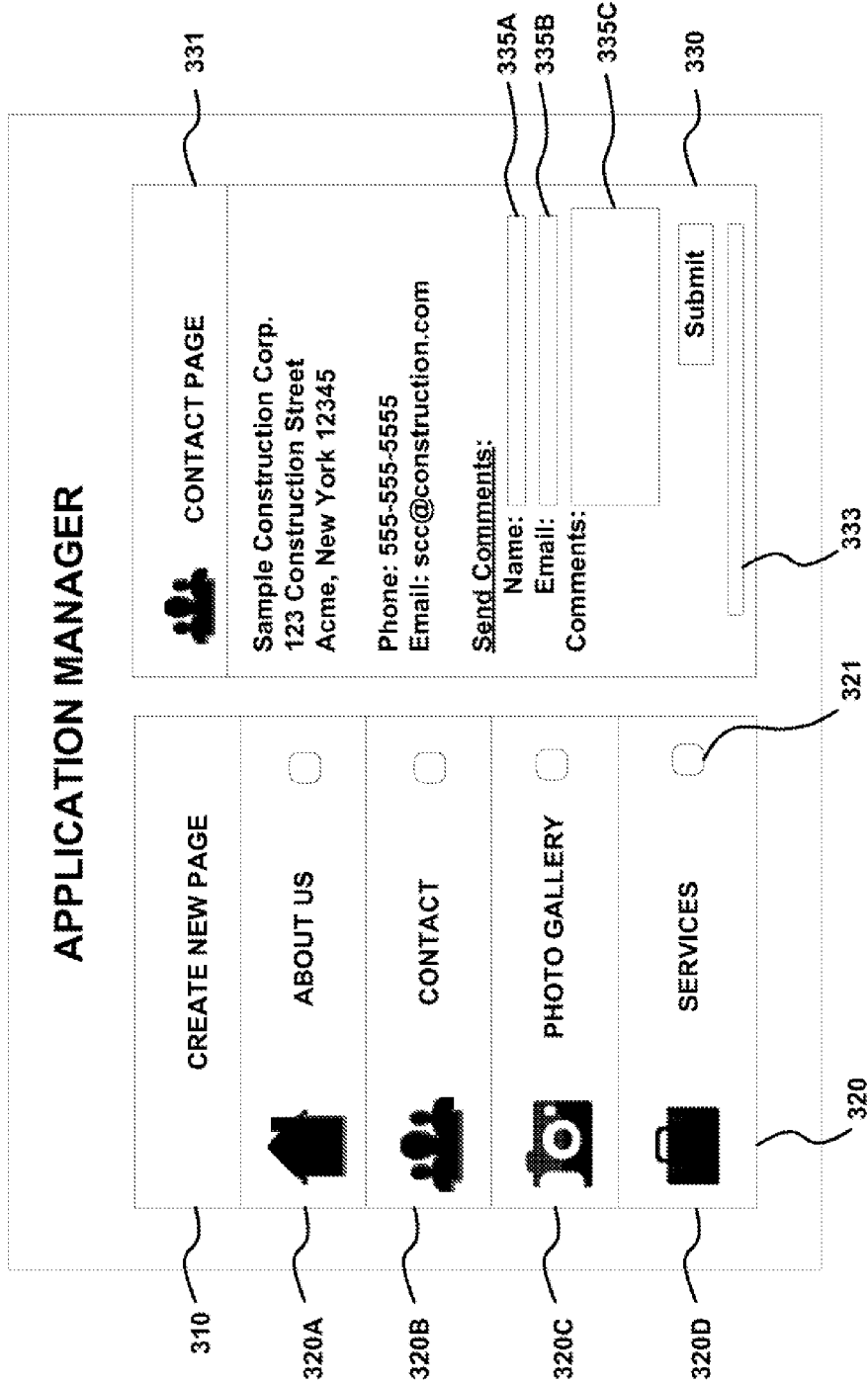

FIGS. 3A-3C illustrate exemplary interfaces that may be displayed by the application builder 150 to a user 105 in order to permit the user 105 to create or update an application 160. FIG. 3A discloses an exemplary interface 300A that may initially be displayed to a user 105 when the user 105 accesses the application builder 150 (e.g., by accessing a website provided on a app building server 140 which provides the application builder 150 to the user 105). As shown therein, a user 105 may select a first option 301 for creating a new application 160 from scratch, a second option 203 for importing content from an existing website to begin creating an application 160, and a third option 303 for updating an existing application 160.

If the user selects the first option 301, the user may be presented with a set of build tools 270 for creating an application. The build tools 270 may permit the user 105 to construct an application 160 in various ways. The build tools 270 may be permit the user 105 to design interfaces for the application and add various types of preassembled modules to the application 160. The build tools 270 may also include application templates that may be customized by the user 105 for designing the application. For example, a user 105 may select an application template for creating an application 160 for a particular type of business (e.g., restaurant, law firm, accounting, construction company, etc.) or for a particular topic or hobby (e.g., a photo album). The application templates may include a plurality of preassembled modules or interfaces.

For example, an application template for a law firm may include preassembled modules that provide an About Us module (e.g., which can be customized by the user 105 to provide a description of the firm), Contact module (e.g., which can be customized by the user 105 to provide contact information), an Employee module (e.g., which can be customized to describe the attorneys who work at the firm), a Consultation Form module (e.g., which permits potential clients to fill out an input form designed by the user 105 and to send comments to an email address specified by the user 105), and other types of modules. In customizing these modules, a user 105 may select different options (e.g., using check boxes or radio buttons), enter information into text input fields (e.g., name, contact info, etc.) and/or upload content (e.g., images, videos, etc.) to populate the preassembled modules associated with the application template.

If the user 105 selects the second option 302 (i.e., "Import content from existing website"), the user 105 may be presented with an interface that permits the user 105 to identify website content that is to be converted into an application 160. The website content may be located on one or more separate websites. In certain embodiments, a user may identify one or more individual web pages to be utilized in creating the application. The user 105 may also be permitted to enter a particular domain name or identify the index page of a website (or other page of a website) and the website crawler 230 will traverse the links on the website based on a set of crawling rules in order to identify web pages that will be incorporated into an application 160 being constructed. The user 105 may also be permitted to enter a URL that specifies the site map for a website or the site map reader 240 may automatically search for and identify a site map for the website. The site map reader 240 will utilize the information in the site map to determine which web pages are to be incorporated into the application 160. Once the website integrator 155 identifies the web pages that are to be incorporated into the application 160, a separate module or interface may be established for one or more of the web pages and the modules may be populated with features which are the same or similar to those included on the web pages. In some cases, preassembled modules may be utilized to facilitate the incorporation of particular website features.

If the third option 303 (i.e., "Update Existing Application") is selected, the user 105 may be presented with a list of one or more applications 160 that the user 105 had previously created or had begun creating. The user 105 may then select an application 160 from the list, and utilize the build tools 270 to update or modify the selected application 160. The user 105 may also be provided with an selection for identifying website content that should be utilized to supplement the existing application 160. If user 105 opts to supplement the application 160 with website content, the user 105 may identify the website content in the same manner described above.

FIG. 3B illustrates an exemplary interface 300B that may be displayed by the application builder 150 to a user 105 after the website integrator 155 has created application modules from website content that was identified by the user 105. In the exemplary interface 300B, the website analyzer 220 scanned a website for a construction company which included four web pages: an About Us page (e.g., which may also be the homepage or other web page describing the company), a Contact page, a Photo Gallery page (e.g., showing photos of completed construction projects), and a Services page (e.g., which describes the services performed by the construction company). As a result, the website integrator 155 created four modules (i.e., an About Us module, a Contact Page module, a Photo Gallery module and a Services module) for the application 160. Each of four web pages may have been identified by either the website crawler 230 or the site map reader 240.

In certain cases, the conversion templates may specify that each of the modules created by the application builder 150 are to be named based on the title of the web page (e.g., which is located between the <title> and </title> tags in the website content) or headings found on the web page (e.g., which may be specified using the <h1> tag or other heading tags). In other embodiments, the modules may be named based on the information in a site map for the web site which specifies the name of the web page.

The interface 300B includes two primary windows: a page detail window 320 and a simulation window 330. The simulation window 330 illustrates how the application 160 being created will appear and function when the application 160 is downloaded and/or installed on a target device 120 or executed on a target device 120. For example, the simulation window 330 may display the interfaces that will be displayed when the application 160 is executed on a target device 120. The interface displayed in the simulation window 330 in FIG. 3B may represent the home menu for an application that permits an individual to select or access different modules for the application. The user 105 may select (e.g., with a mouse or by tapping a touch screen) the icons in the simulation window 330 in order to access or view the interface that would be displayed on a target device 120 if that particular icon had been selected. For example, clicking on the camera icon would cause the simulation window 330 to display the photo gallery page in the same or similar manner as it would be displayed on a target device 160.

The page detail window 320 provides a list of buttons (i.e., About Us button 320A, Contact page button 320B, Photo Gallery button 320C, and Services button 320D), each of which is associated with a particular application module that has been created for the application 160. The buttons 320A-320D correspond to the icons in the simulation window 330. Each one of the button includes a remove option 321 that permits a user to delete the entire application module. Assuming the user 105 does not wish to delete an application module, the user 105 may click on or otherwise select a button in the page detail window 320 in order to edit the contents of the associated module. For example, if the user clicked on the About Us button 320A, the user 105 may be presented with a form (e.g., which included text boxes, radio buttons, check boxes, etc.) that permits the user to edit the text and images displayed on the About Us page of the application 160. Likewise, if the user 105 clicked on the Photo Gallery button 320C, the user 105 may be presented with a form that permits the user to upload new photos to the gallery or delete existing photos in the gallery, or to make other types of modifications to the Photo Gallery module (e.g., such as changing the heading or text). Selecting a button 320A-320D may also permit the user 105 to modify the titles 335, fonts, color schemes, headings, alignment settings and other aspects of the application modules.

Each of the modules that have been created may be associated with a particular web page of the website that may be utilized to populate the content for the module. For example, in generating the About Us module, the website integrator 155 may extract text, hyperlinks, images, and other content from the About Us page on the website and incorporate this content into the About Us module. As explained above, the content from the website may also be utilized to populate portions of preassembled modules used for constructing certain types of modules. For example, the application builder 150 may include a preassembled module for providing a photo gallery. Thus, if the website analyzer 220 detects a photo gallery web page, a preassembled photo gallery module can utilized to create a photo gallery for the application 160. Initially, the preassembled module may already include functionality for displaying a photo gallery but may not include any images to be displayed in the photo gallery. Thus, the images from the photo gallery on the website can be extracted and utilized to populate the preassembled module for the photo gallery.

FIG. 3C illustrates an exemplary interface 300C that may be displayed in response to a user 105 selecting the contact icon in the simulation window 330. In response to a user selecting the contact icon in the simulation window 330, the simulation window 330 may display the contact module that has been populated by the website integrator 155 with content from the Contact page on the construction website. FIG. 4 illustrates a corresponding web page 400 for the construction company which served as a basis for creating and populating the Contact module for the application 160 which is displayed in the simulation window 330 of FIG. 3C.

The text on the Contact page 400 of the website provides contact information (e.g., street address, email address, phone number, etc.) for the construction company. The browser rendering the website may include a title bar 410 that displays the name of the company or other information. The web page 400 includes a heading 431, a menu 450 of hyperlinks, and an input form 430 that permits individuals to send comments to the company (e.g., the input provided to the form may be emailed to the company associated with the website). The input form 430 includes a first input field 435A for providing a name, a second input field 435B for providing an email address, and a third input field 435C for specifying comments. After the user 105 has filled out the form 430, the user may press the "Submit" button to send the contents of the form to the company (e.g., via email).

The Contact module derived from the Contact page may represent a preassembled module for creating a contact page that has been populated with website features that were detected by the website analyzer. Before being populated with the website features, the preassembled contact module may reserve variables for specifying certain features, namely the module title, text that is displayed by the module, and links on a menu that is displayed by the module. The preassembled contact module may also include function for creating a contact form.

One or more conversion templates may be utilized to populate the variables of the preassembled contact module. For example, the variable associated with display text may be populated with contact information (e.g., the address, phone number and email) that was displayed on the web page 400. To accomplish this, the website analyzer 220 may utilize the rule set 210 to detect the text that is displayed on the web page 400 and may further utilize a conversion template to copy the text to the appropriate variable associated with the preassembled contact module. The title 331 or name of the module was determined by the heading 431 which was specified on the website (in other cases the title bar 410 may serve as the basis for naming the module). To accomplish this, the website analyzer 220 may utilize the rule set 210 to detect the heading that is displayed on the web page 400 (e.g., by detecting the text that is associated with the <h1> tag) and may further utilize a conversion template to copy the heading to the appropriate variable associated with the preassembled contact module.

Similarly, a menu 333 displayed at the bottom of the module includes similar links to the menu 450 that was displayed on the web page 400 (although the links are not shown in detail in FIG. 3C). To accomplish this, the website analyzer 220 may utilize the rule set 210 to detect the menu 450 displayed on the web page 400 (e.g., by detecting hyperlinks and the associated <a href> tags) and may further utilize a conversion template to populate variables associated with the preassembled contact module. The variables may define the name of the menu items (e.g., About Us, Photo Gallery, Contact Page and Services) which are displayed on the menu 330 and the URLs associated with the with menu items. In some cases, the conversion template extract the "href" attribute associated with the hyperlink tag to specify URLs that should be associated with the menu items in the module menu 333. In other cases, the conversion template may associate the menu items with internal links to other application modules that have been created for the application.

The Contact module also includes the contact form 430 that was displayed on the web page 400. In order to incorporate the contact form 430 into the Contact module, the website analyzer 220 may search the website content (e.g., utilizing regular expressions and/or string querying operations) for particular types of HTML tags (e.g., <form> tags and <input> tags) that are associated with the form in accordance with the rule set 210. The conversion template may provide this information (e.g., which indicates the number of input fields, the type of input fields, the names of the input fields, etc.) to a function that generates an equivalent or similar form. The conversion template may determine that the contents of the module contact form should be sent to the same destination (e.g., e-mail address) that was specified by the "action" attribute of the form tag (i.e., <form>) in the website content for the web page 400.

After the website content is converted to application content, the build tools 270 provided by the application builder 150 may permit a user 105 to modify the modules that have been created by the website integrator 155. The build tools 270 may also permit the user to add additional modules to the application 160. For example, if the user 105 desired to add a module to the application 160 that was not derived from the website content, the user 150 may click on a button 310 to create a new page or module. In order to allow the user 105 to quickly create a module, the user may be permitted to select from a plurality of preassembled modules. For example, the user 105 can select a preassembled module for creating an image gallery, a links page, a contact page, an RSS feed and other types of pages or modules. The user 105 may then customize the module by filling out a form (e.g., which include text boxes, radio buttons, or other HTML input elements) and/or uploading multimedia data to populate the contents of the module.

As mentioned above, the application distributor 260 may be configured to assist a user 105 in distributing an application 160 to a target device 120 and/or an application marketplace that permits individuals to download or purchase applications 160. In certain embodiments, an application marketplace may be provided by a app building server 140 that was utilized to create and/or update the application. In other embodiments, the application marketplace may be provided by a server which is located remotely or externally from the app building server 140.

Figure 5:
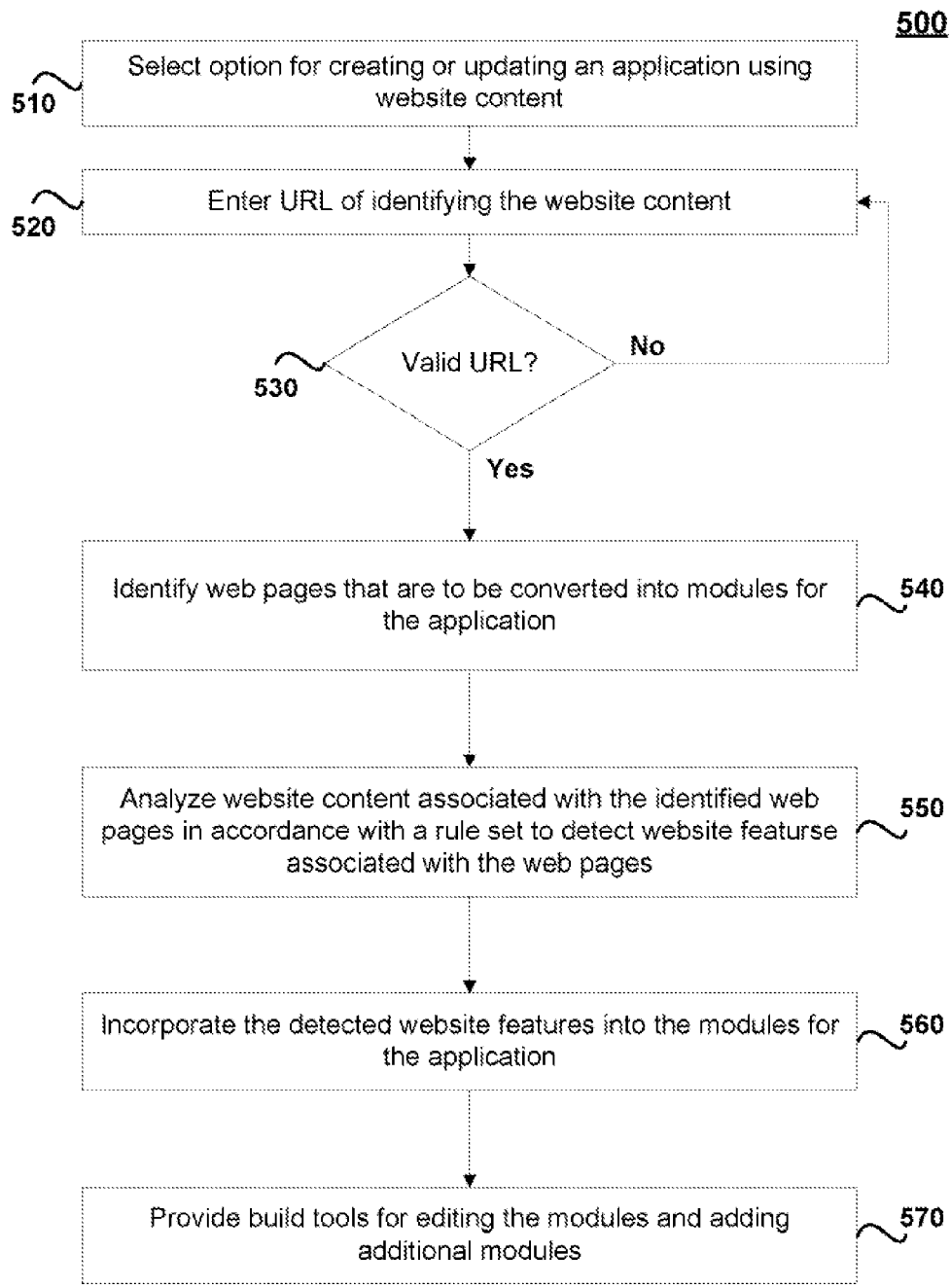
FIG. 5 is a flow chart illustrating a method for creating an application using website content in accordance with certain embodiments.

Moving on, FIG. 5 illustrates an exemplary method 500 for creating or updating an application 160 (or portion thereof) using website content in accordance with certain embodiments. A user 105 may select an option for creating or updating an application using website content 135 (step 510). For example, a user 105 may select a button or link that permits the user 105 to create a new application using the content of one or more websites (e.g., similar to the second option 302 in FIG. 3A), or to supplement a pre-existing application with the content of from one or more websites (e.g., similar to the third option 303 in FIG. 3A). In certain embodiments, the interface providing the options may be provided to the user over a network 190 from a app building server 140 or by an application running on a personal computing device 110.

The URL of the website content may be provided by the user 105 to identify a website that is to be utilized in creating the application 160 (step 520). For example, the user 105 may input the URL for the index page for the website or the URL for the site map for the website. If the user desires, a plurality of URLs may be submitted (e.g., in the case where multiple websites are being incorporated into an application 160 that is being constructed). It should be noted that in other embodiments, the user may identify one or more individual web pages that may be utilized in creating or updating an application (rather than identifying an entire website).

After the user 105 specifies a URL, a check may be performed to determine whether or not the URL that was submitted is a valid URL (step 530). For example, a check may be performed to determine whether the URL actually identifies a web page or whether the URL has been typed improperly. If the URL submitted by the user 105 is not valid, then the method 500 proceeds back to step 520 and the user 105 may once again be prompted to enter another URL.

Assuming that the URL which was submitted is valid, one or more web pages are identified that are to be converted into modules for application (step 540). This may involve identifying a site map (either automatically or by input from a user) and processing or scanning the site map (e.g., using the site map reader 240) to determine the web pages that are to be converted into modules for the application 160. Some or all of the web pages identified in the site map may be converted into modules for the application 160. Identifying web pages that are to be converted into modules for the application 160 may also involve crawling or scanning a website 160 (e.g., using website crawler 230) to identify the web pages that comprise the website. This may include crawling the hyperlinks on a website based on a set of crawling rules as described above.

Regardless of how the web pages which are to be converted into application modules are identified, the web site content 135 associated with the identified web pages may be analyzed in accordance with a rule set 210 to detect website features associated with the web pages (step 550). In certain embodiments, this may be performed by the website analyzer 220 described above. The website content that is analyzed may include multimedia data, HyperText Markup Language (HTML) code and tags (and tag attributes), event triggers, style sheets, scripting code and any other data associated with a website or web page. Based on the analysis of the website content, one or more website features may be detected.

The website features that are detected by analyzing the website content may encompass nearly any feature that may be displayed on a web page. For example, the website features may include multimedia data (e.g., text, images, video, audio recordings, etc.) that is displayed on the web pages. The detected website features also include menus, input forms, social media links (e.g., links to web pages on social networks such as Facebook™, Twitter™ or LinkedIn™), photo galleries, shopping carts, event calendars, RSS feeds, product listings, hyperlinks, web page titles, web page headings, blogs, contact lists, or other features that are displayed on a web page.

The website features may then be incorporated into the modules that are being created or updated (step 560). One or more conversion templates may be utilized to incorporate the website features into the application 160. In certain embodiments, separate application modules may be constructed for each of the web pages that were identified using the site map or crawling operations described above. The application module created for a particular web page may be customized to incorporate the multimedia data included on the web page, along with any other website feature (e.g., input forms, hyperlinks, photo galleries, etc.) that is included on the web page.

In certain embodiments, to facilitate the construction of the application modules, preassembled modules may be populated with multimedia content from a web page. For example, a module for a photo gallery may be populated with images extracted from a web page if a photo gallery was detected on the web page, or a module for an event calendar may be populated with event data (e.g., event name, date, time, etc.) extracted from a web page if an event calendar was detected on the web page. Other types of preassembled modules may also be utilized.

Once the application modules are derived from the website content 135, the user 105 utilizing the application builder 150 to construct the application 160 may also be provided with a set of build tools 270 that permit the user 105 to edit the application modules, and to supplement the application 160 with additional modules (step 570). As explained above, the build tools 270 may permit the user 105 to edit the application modules associated with an application 160 in various ways. For example, the build tools 270 may permit the user 105 to modify (e.g., add, delete, edit) multimedia data displayed on the interfaces associated with the application modules, and to supplement the interfaces to include nearly any type of website feature (e.g., input forms, calendars, RSS feeds, etc.).

While there have shown and described and pointed out various novel features of the invention as applied to particular embodiments thereof, it will be understood that various omissions and substitutions and changes in the form and details of the systems and methods described and illustrated, may be made by those skilled in the art without departing from the spirit of the invention. Amongst other things, the steps shown in the methods may be carried out in a different orders in many cases where such may be appropriate. Those skilled in the art will recognize, based on the above disclosure and an understanding therefrom of the teachings of the invention, that the particular hardware and devices that are part of the system described herein, and the general functionality provided by and incorporated therein, may vary in different embodiments of the invention. Accordingly, the particular system components shown in the figures are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation.

What is claimed is:

1. A system for creating a mobile application based on website content, comprising:
   a computing device having a processor and physical memory storing instructions that cause the processor to:
      provide an application development platform adapted to utilize website content to create and update a mobile application;
      store a first set of conversion templates that include rules for incorporating website features into a web application and a second set of conversion templates that include rules for incorporating application features of the web application into the mobile application;
      receive an input that identifies a site map associated with the website content;
      examine the site map to identify web pages for creating a web application that can be converted to the mobile application;
      crawl hyperlinks specified in the website content in accordance with a set of crawling rules to identify at least one additional web page associated with the website content;
      analyze the website content associated with the identified web pages in accordance with a rule set to detect website features, wherein the rule set includes rules for detecting content features, functional features and design features;
      determine one or more application modules that are to be customized based on the detected website features;
      incorporate a portion of the detected website features into the one or more application modules;
      create the web application utilizing the one or more application modules, the web application being configured to execute in a web browser; and
      utilize the web application to generate the mobile application, wherein utilizing the web application to generate the mobile application comprises:
         transmitting data for displaying a list of application types;
         receiving a selection that identifies an application type for the mobile application;
         selecting a conversion template from the second set of conversion templates associated with the identified application type;
         identifying application features included in the web application;
         utilizing the selected conversion template to incorporate the identified application features into the mobile application;
         generating compiled data for the mobile application based on the one or more application modules into which the portion of the detected website features are incorporated; and
         generating a configuration file comprising an identifier for the mobile application, the configuration file being adapted for transmission to, and execution on, a mobile device;
         wherein the identifier enables the retrieval of at least a portion of the compiled data by the mobile device from a remote storage location in response to the mobile application being installed on or executed by the mobile device.

2. The system of claim 1, wherein the received input specifies a uniform resource locator (URL) identifying the site map.

3. The system of claim 1, wherein information in the site map is utilized to determine names for the application modules.

4. The system of claim 1, wherein the processor is further configured to:
   update the mobile application based on additional website content using the application development platform.

5. The system of claim 1, wherein the processor is configured to:
   analyze the website content with the rule set to detect a website feature selected from the group consisting of:
      multimedia data;
      an input form;
      a photo gallery;
      a video gallery;
      a blog;
      a social media link;
      a RSS feed;
      an Atom feed;
      an event calendar; and
      a shopping cart.

6. The system of claim 1, wherein the processor is configured to:
   provide a set of build tools to permit a user to modify the one or more application modules and the detected website features.

7. The system of claim 1, wherein analyzing the website content includes analyzing HTML source code, scripting code or CSS style sheet data to detect the website features associated with the website content.

8. The system of claim 1, wherein each application module is associated with a set of variables and wherein incorporating the detected website features into an application module includes populating the variables of the application module with website content from a corresponding web page that is identified using the site map.

9. The system of claim 1, wherein the processor is further configured to:
   transmit data for rendering a manager interface that provides a list of the one or more application modules; and
   receive a selection via the manager interface to modify an interface associated with the one or more application modules.

10. The system of claim 1, wherein the processor is further configured to:
    transmit data for rendering a simulation window that simulates how interfaces associated with the one or more application modules are displayed when the mobile application is executed on a target device.

11. The system of claim 1, wherein the processor is further configured to:
    receive an input that identifies supplementary website content to be utilized in updating the mobile application;
    analyze the supplementary website content with the rule set to detect additional website features;

update the one or more of the selected application modules with the additional website features; and generate updated compiled data for the mobile application.

12. The system of claim 1, wherein the one or more application modules are each configured to provide a separate interface for the mobile application that corresponds to one of the identified web pages.

13. A non-transitory computer storage medium comprising program instructions for creating a mobile application based on website content, wherein the program instructions, when executed on a computer, cause the computer to:

provide an application development platform adapted to utilize website content to create and update a mobile application;

store a first set of conversion templates that include rules for incorporating website features into a web application and a second set of conversion templates that include rules for incorporating application features of the web application into the mobile application;

receive an input that identifies a site map associated with the website content;

examine the site map to identify web pages for creating a web application that can be converted to the mobile application;

crawl hyperlinks specified in the website content in accordance with a set of crawling rules to identify at least one additional web page associated with the website content;

analyze the website content associated with the identified web pages in accordance with a rule set to detect website features, wherein the rule set includes rules for detecting content features, functional features and design features;

determine one or more application modules that are to be customized for the mobile application based on the detected website features;

incorporate a portion of the detected website features into the one or more application modules for the mobile application;

create a web application utilizing the one or more application modules, the web application being configured to execute in a web browser; and utilize the web application to generate the mobile application, wherein utilizing the web application to generate the mobile application comprises:

transmitting data for displaying a list of application types;

receiving a selection that identifies an application type for the mobile application;

selecting a conversion template from the second set of conversion templates associated with the identified application type;

identifying application features included in the web application;

utilizing the selected conversion template to incorporate the identified application features into the mobile application;

generating compiled data for the mobile application based on the one or more application modules into which the portion of the detected website features are incorporated; and generating a configuration file comprising an identifier for the mobile application, the configuration file being adapted for transmission to, and execution on, a mobile device;

wherein the identifier enables the retrieval of at least a portion of the compiled data by the mobile device from a remote storage location in response to the mobile application being installed on or executed by the mobile device.

14. The computer storage medium of claim 13, wherein the received input specifies a uniform resource locator (URL) identifying the site map.

15. The computer storage medium of claim 13, wherein information in the site map is utilized to determine names for the application modules.

16. The computer storage medium of claim 13, wherein the program instructions further cause the computer to:

update the mobile application based on additional website content using the application development platform.

17. The computer storage medium of claim 13, wherein the program instructions further cause the computer to:

analyze the website content with the rule set to detect a website feature selected from the group consisting of:
multimedia data;
an input form;
a photo gallery;
a video gallery;
a blog;
a social media link;
a RSS feed;
an Atom feed;
an event calendar; and
a shopping cart.

18. The computer storage medium of claim 13, wherein the program instructions further cause the computer to:

provide a set of build tools to permit a user to modify the one or more application modules and the detected website features.

19. The computer storage medium of claim 13, wherein analyzing the website content includes analyzing HTML source code, scripting code or CSS style sheet data to detect the website features associated with the website content.

* * * * *